US008356829B2

(12) United States Patent
Shirai

(10) Patent No.: US 8,356,829 B2
(45) Date of Patent: Jan. 22, 2013

(54) BICYCLE SUSPENSION-SETTING ADJUSTOR ASSEMBLY

(75) Inventor: Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 570 days.

(21) Appl. No.: 12/626,649

(22) Filed: Nov. 26, 2009

(65) Prior Publication Data
US 2011/0121525 A1 May 26, 2011

(51) Int. Cl.
B62K 21/00 (2006.01)
B62K 21/20 (2006.01)

(52) U.S. Cl. ......... 280/283; 280/276; 280/284; 188/297
(58) Field of Classification Search .................. 280/276, 280/279, 284, 285, 288; 188/275, 297
See application file for complete search history.

(56) References Cited

U.S. PATENT DOCUMENTS

| 2005/0194197 A1* | 9/2005 | Fukuda et al. ............... 180/227 |
| 2007/0074939 A1* | 4/2007 | Chen ............................ 188/297 |
| 2007/0090624 A1* | 4/2007 | Chen ............................ 280/276 |
| 2007/0170689 A1* | 7/2007 | Chen ............................ 280/276 |
| 2007/0262557 A1* | 11/2007 | Kunstle ........................ 280/279 |
| 2009/0324327 A1* | 12/2009 | McAndrews et al. ...... 403/409.1 |
| 2010/0219607 A1* | 9/2010 | Kunstle et al. ................ 280/276 |

FOREIGN PATENT DOCUMENTS
EP 1 826 453 A1 8/2007

* cited by examiner

Primary Examiner — Lesley Morris
Assistant Examiner — Marc A Scharich
(74) Attorney, Agent, or Firm — Global IP Counselors, LLP

(57) ABSTRACT

A bicycle suspension-setting adjustor assembly is provided with a suspension tube attachment structure, a first actuator, a second actuator and a suspension-setting adjustment unit. The first actuator is rotatably mounted to the suspension tube attachment structure. The second actuator is rotatably mounted to the suspension tube attachment structure to rotate independent of rotation of the first actuator. The suspension-setting adjustment unit is operatively coupled to the first and second actuators. The suspension-setting adjustment unit adjusts a first suspension setting in response to rotation of the first actuator by using rotational movement of the suspension-setting adjustment unit. The suspension-setting adjustment unit adjusts a second suspension setting in response to rotation of the second actuator by using axial movement of the suspension-setting adjustment unit.

14 Claims, 8 Drawing Sheets

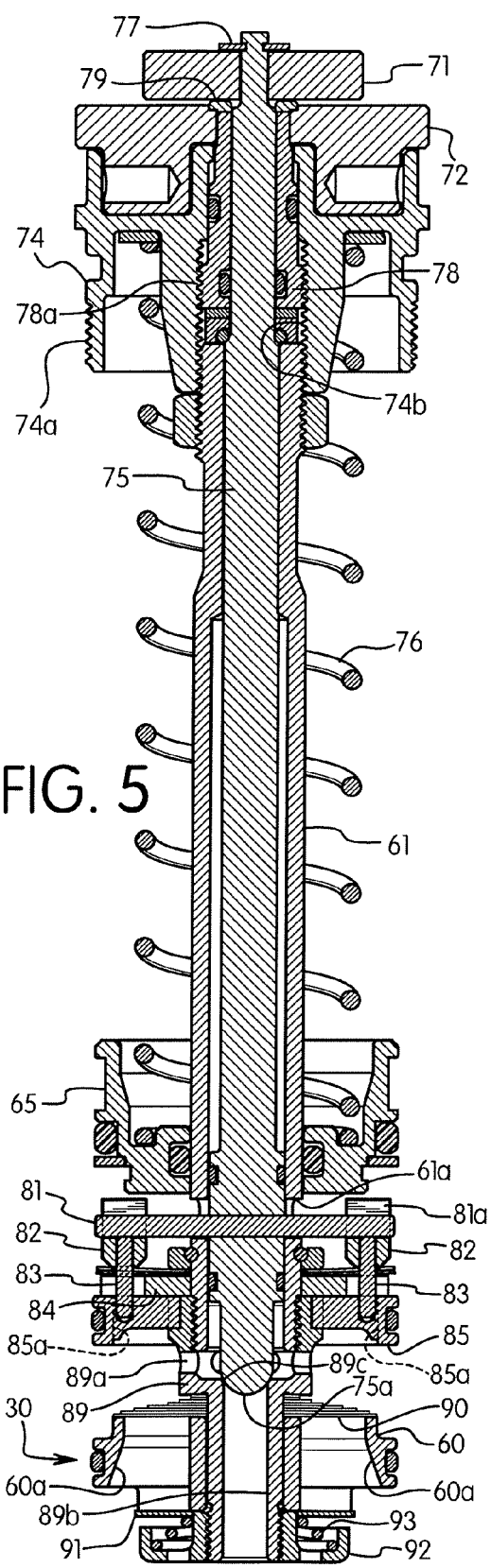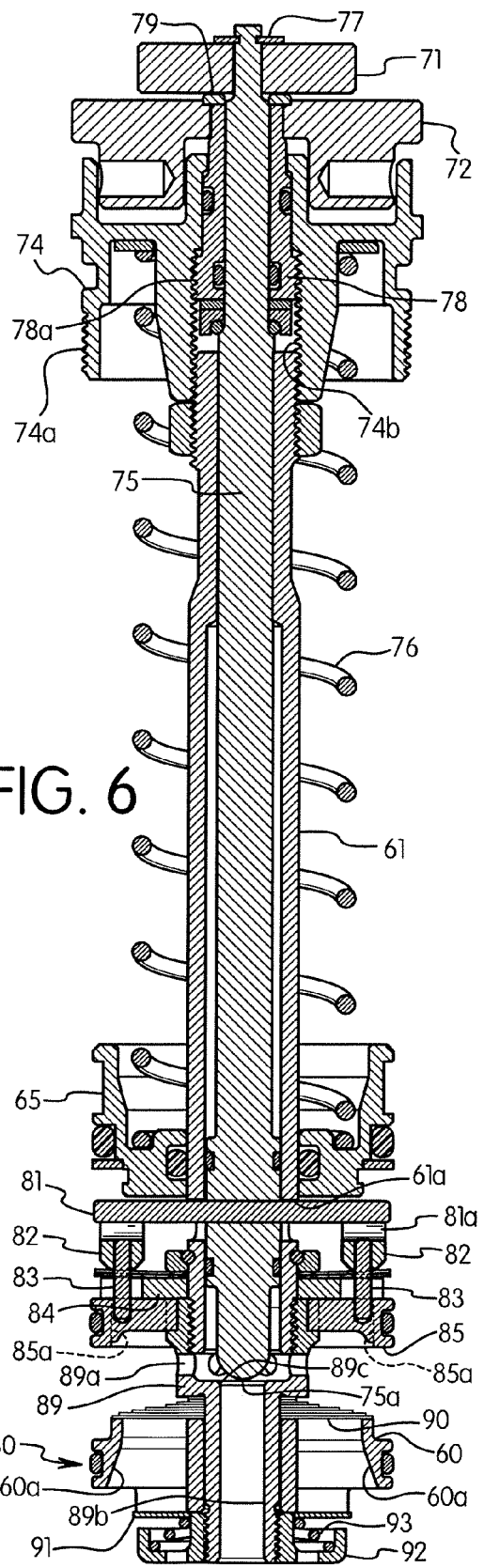

BICYCLE SUSPENSION-SETTING ADJUSTOR ASSEMBLY

BACKGROUND

1. Field of the Invention

This invention generally relates to a bicycle suspension for operating a bicycle component. More specifically, the present invention relates to a bicycle suspension that has a bicycle suspension-setting adjustor assembly for changing a suspension operating condition of the bicycle suspension.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In the past, most bicycles had rigid frames which typically transmitted the shocks resulting from rough riding surfaces directly to the rider. In other words, most bicycles were not provided with any front or rear suspension. Recently, bicycles, especially mountain bikes (MTB) and all terrain bikes (ATB), have been outfitted with front and/or rear suspension assemblies to absorb the shocks transmitted to the rider when riding on a rough road.

The first suspension forks had about 1½ to 2 inches (38 to 50 mm) of suspension travel. Forks are now available with about 4 to 6 inches (100 to 150 mm) of suspension travel or more. Bicycles with front suspension and rigid, non-suspended rear wheels, or hardtails became popular nearly overnight. On most mountain bicycles, the front fork contains a set of shock absorbers. The suspension travel and handling characteristics vary depending on the type of mountain biking the fork is designed for. For instance, bicycle manufacturers produce different forks for cross-country (XC), downhill and freeride riding.

The shock absorber usually includes a spring and a damper or dashpot. The spring may be implemented with a steel or titanium coil, an elastomer, or even compressed air. The damper is usually implemented by forcing oil to pass through one or more small openings or shim stacks. On some bicycles, the spring, the damper, or both may be adjusted for rider weight, riding style, terrain, or any combination of these or other factors. Also, the two components are sometimes separated with the spring mechanism being in one leg and the damper being in the other leg.

In these bicycles with front suspension forks, it is sometimes desirable to be able to adjust the suspension stroke, adjust the spring rate of the spring mechanism, and/or lockout the suspension, as needed and/or desired. Thus, there have been proposals to provide suspensions that include adjust the suspension stroke and/or the spring rate of the spring mechanism.

SUMMARY

According to one aspect a bicycle suspension-setting adjustor assembly is provided for changing two suspension settings of the bicycle suspension in which the freedom of layout of internal components can be increased.

In view of the above, a bicycle suspension-setting adjustor assembly is provided that mainly comprises a suspension tube attachment structure, a first actuator, a second actuator and a suspension-setting adjustment unit. The first actuator is rotatably mounted to the suspension tube attachment structure. The second actuator is rotatably mounted to the suspension tube attachment structure to rotate independent of rotation of the first actuator. The suspension-setting adjustment unit is operatively coupled to the first and second actuators. The suspension-setting adjustment unit adjusts a first suspension setting in response to rotation of the first actuator by using rotational movement of the suspension-setting adjustment unit. The suspension-setting adjustment unit adjusts a second suspension setting in response to rotation of the second actuator by using axial movement of the suspension-setting adjustment unit.

In addition to the above mentioned aspect, other objects, features, aspects and advantages of the present invention will become apparent to those skilled in the art from the following detailed description, which, taken in conjunction with the annexed drawings, discloses one embodiment.

BRIEF DESCRIPTION OF THE DRAWINGS

Referring now to the attached drawings which form a part of this original disclosure:

FIG. 5 is a longitudinal cross sectional view of the bicycle suspension-setting adjustor assembly in accordance with the illustrated embodiment, with the second actuator (user operating member) in a first operating position state in which the front suspension is in a high damping characteristic position;

FIG. 6 is a longitudinal cross sectional view of the bicycle suspension-setting adjustor assembly in accordance with illustrated embodiment, with the second actuator (user operating member) in a second operating position state in which the front suspension is in a low damping characteristic position;

DETAILED DESCRIPTION OF THE EMBODIMENTS

A selected embodiment will now be explained with reference to the drawings. It will be apparent to those skilled in the art from this disclosure that the following descriptions of the illustrated embodiment is provided for illustration only and not for the purpose of limiting the invention as defined by the appended claims and their equivalents.

Figure 1:
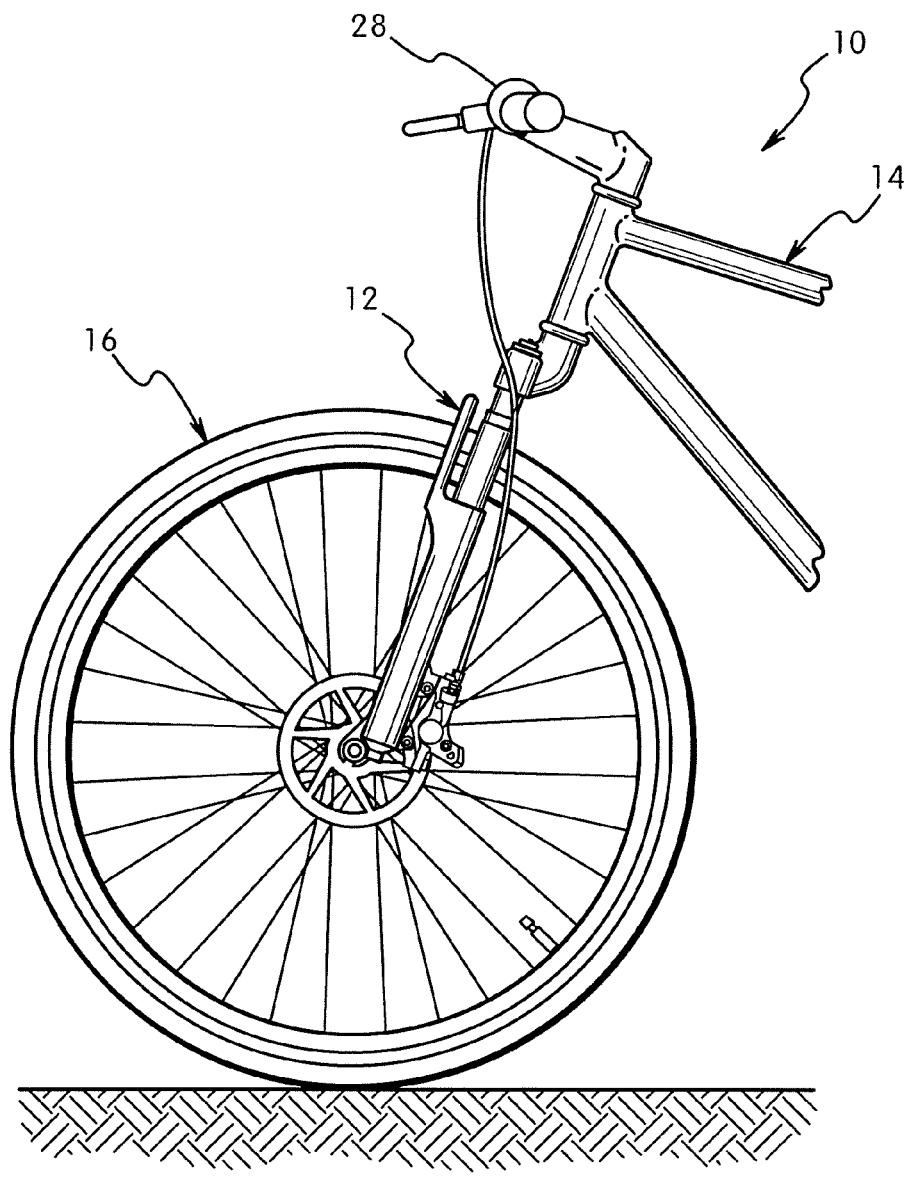
FIG. 1 is a partial side elevational view of a front portion of a bicycle with a bicycle suspension that is equipped with a bicycle suspension-setting adjustor assembly in accordance with one illustrated embodiment.

Referring initially to FIG. 1, a bicycle 10 is illustrated that is equipped with a front suspension fork 12. Basically, the front suspension fork 12 has an upper end that is rotatably mounted to a front part (head tube) of a bicycle frame 14 in a conventional manner, and a lower end that rotatably supports a front wheel 16. The rest of the bicycle 10 can be any type of bicycle, and thus, the bicycle 10 will not be discussed or illustrated in further detail herein.

Figure 2:
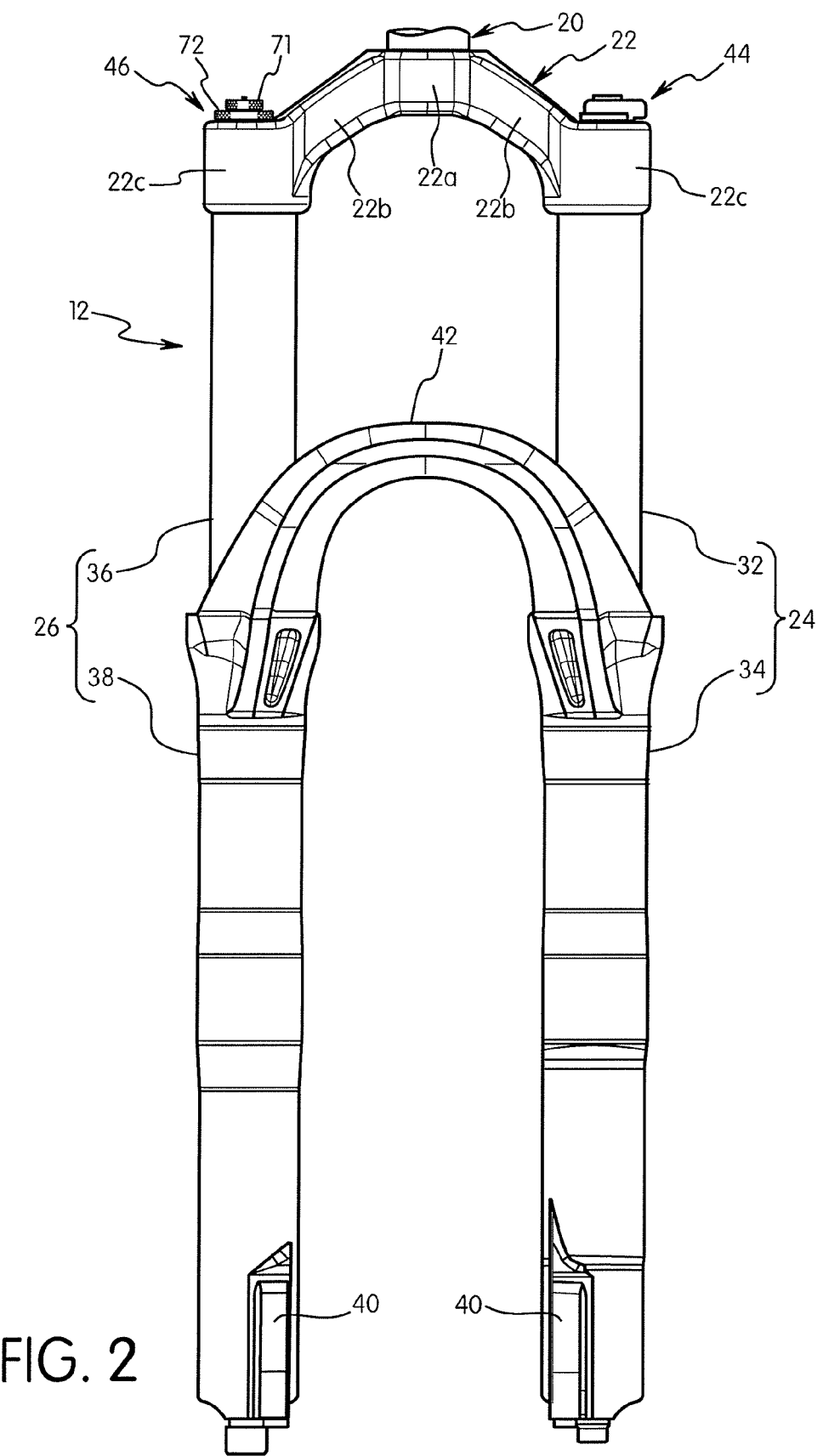
FIG. 2 is a front elevational view of a front suspension with the bicycle suspension-setting adjustor assembly in accordance with the illustrated embodiment.

As seen in FIG. 2, the front suspension fork 12 basically includes a steerer tube 20, a crown 22, a first leg or telescopic tube 24 and a second leg or telescopic tube 26. The legs 24 and 26 expand and contract for absorbing shocks while riding the bicycle 10 over rough terrain. The first leg 24 constitutes a first suspension assembly, while the second leg 26 constitutes a second suspension assembly. The crown 22 is secured to a bottom end of the steerer tube 20. The legs 24 and 26 are secured at opposite lateral end of the crown 22. Typically, as seen in FIG. 1, a handlebar 28 is fixedly mounted to the steerer tube 20 at its upper end for steering the front wheel 16. Thus, the steerer tube 20 provides a means for connection of the handlebar 28 to the front suspension fork 12.

The steerer tube 20 includes, for example, a metal pipe member. The steerer tube 20 is rotatably supported by the head tube of the frame 14. The top end of the steerer tube 20 is coupled to the handlebar 28. The bottom end of the steerer tube 20 is inserted in the center of the crown 22, and is secured therein using an appropriate means such as press fitting, screw fitting or welding.

The crown 22 constitutes a fork shoulder unit that includes, for example, a metal molded member. The crown 22 has a cylindrical column securing portion 22a at its center for mounting the steerer tube 20. The crown 22 also has a pair of arms 22b that extend laterally from the column securing portion 22a while also curving downward from the column securing portion 22a. The free ends of the arms 22b have cylindrical suspension mounting portions 22c for clamping the upper ends of the legs 24 and 26, respectively.

Figure 3:
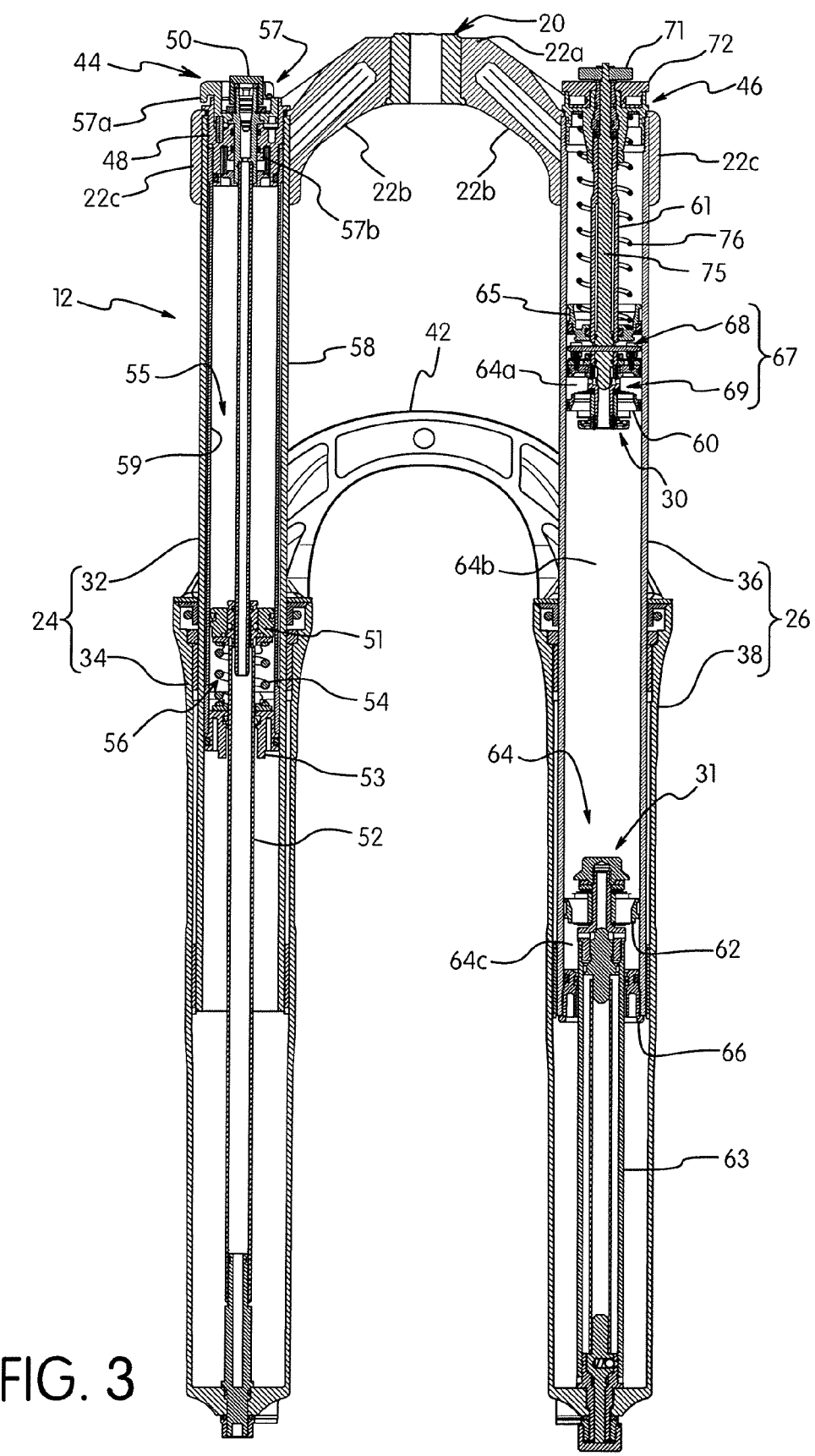
FIG. 3 is a cross sectional view of the front suspension with the bicycle suspension-setting adjustor assembly in accordance with the illustrated embodiment.
Figure 4:
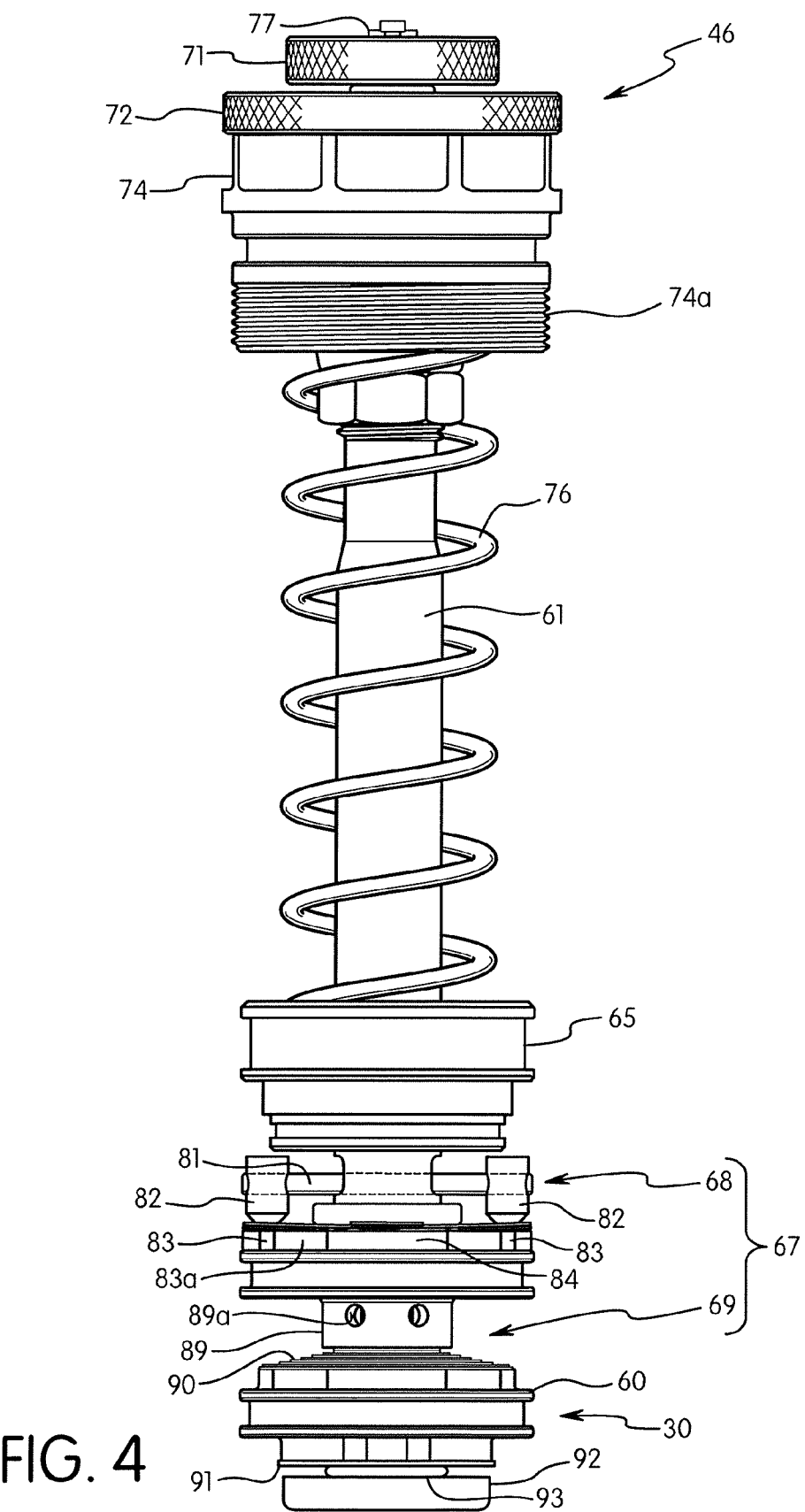
FIG. 4 is an elevational view of the bicycle suspension-setting adjustor assembly in accordance with the illustrated embodiment.
Figure 7:
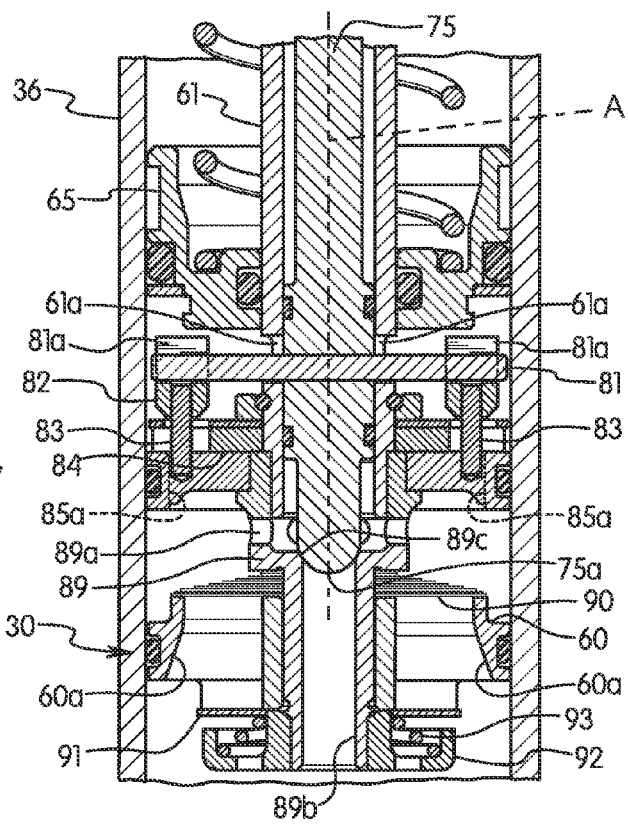
FIG. 7 is a partial longitudinal cross sectional view of the bicycle suspension-setting adjustor assembly in accordance with the illustrated embodiment, with the first actuator (user operating member) in a first operating position state in which the front suspension is in a lockout position.
Figure 8:
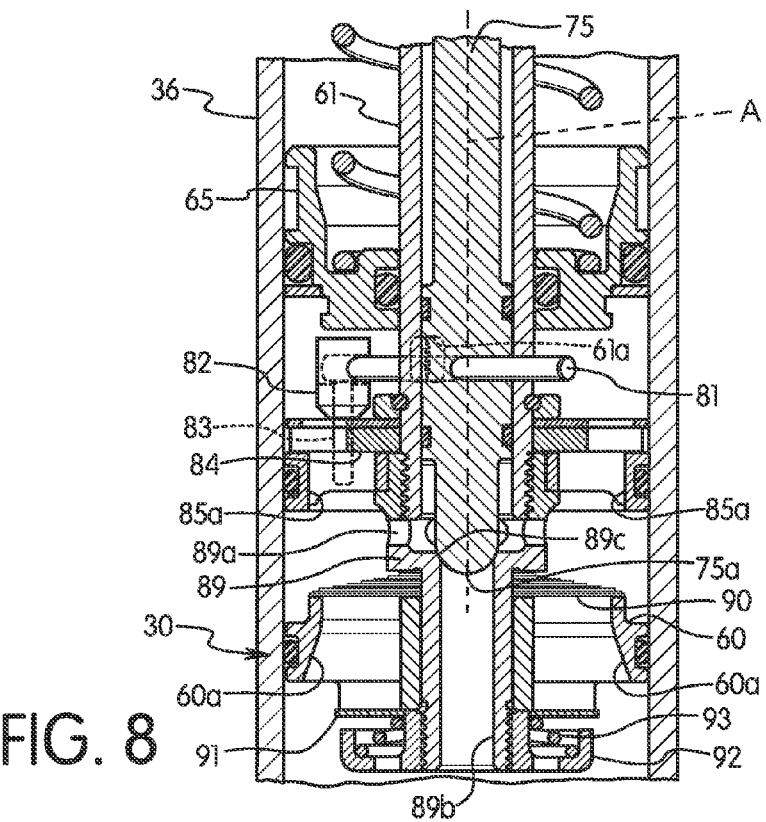
FIG. 8 is a partial longitudinal cross sectional view of the bicycle suspension-setting adjustor assembly in accordance with the illustrated embodiment, with the first actuator (user operating member) in a second operating position state in which the front suspension is in a non-lockout position.
Figure 9:
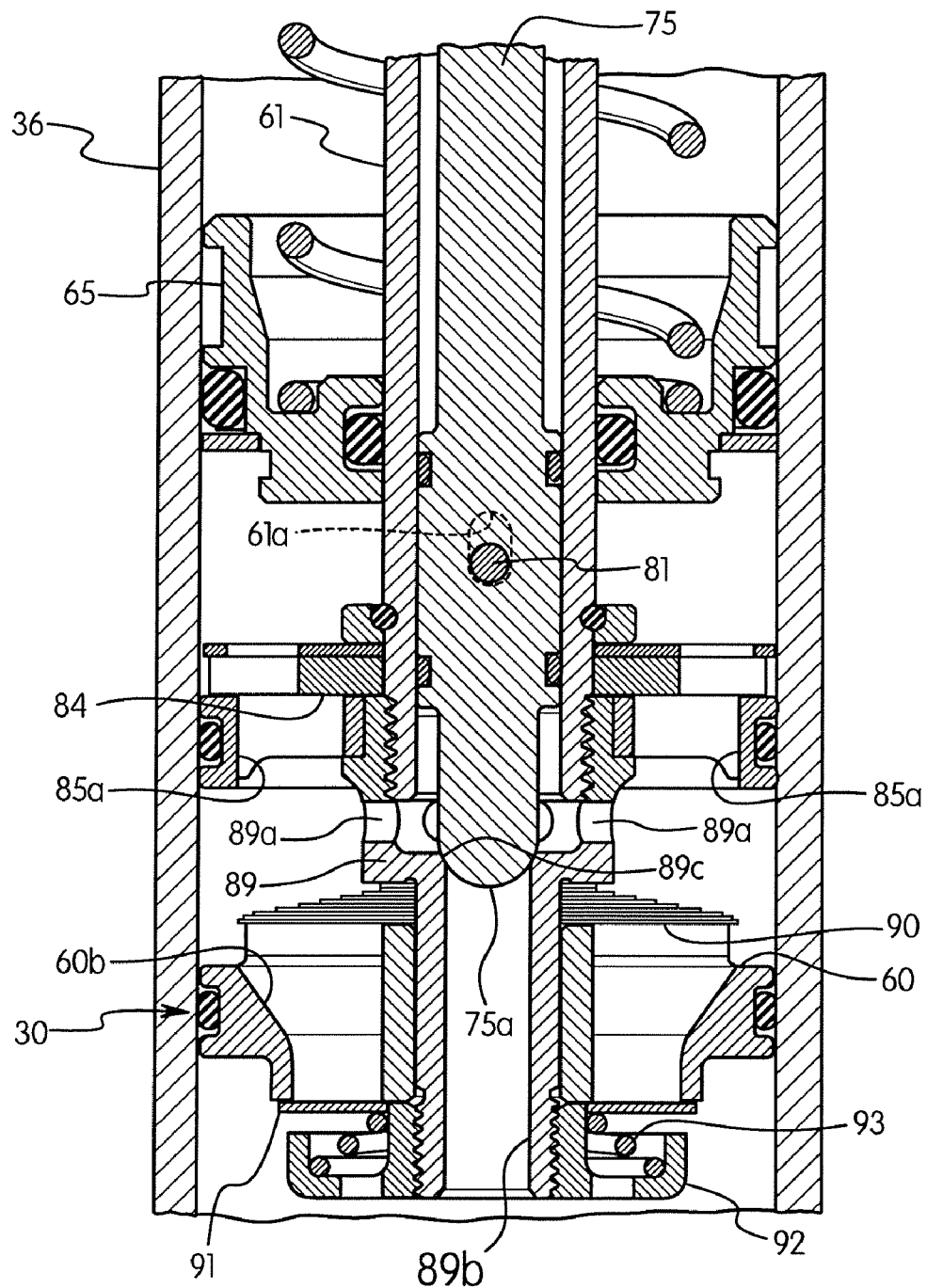
FIG. 9 is a partial longitudinal cross sectional view of the bicycle suspension-setting adjustor assembly in accordance with the illustrated embodiment, in which the cross section is rotated ninety degrees from the cross sections of FIGS. 7 and 8 with respect to the center axis.

As seen in FIG. 3, a longitudinal cross sectional view of the front suspension fork 12 is illustrated to show various internal components of the front suspension fork 12. In this illustrated embodiment, basically, the first leg 24 constitutes an air-spring mechanism of the front suspension fork 12, while the second leg 26 constitutes a damping mechanism of the front suspension fork 12. Of course, it will be apparent to those skilled in the bicycle field that the air-spring mechanism can be in the second leg and the damping mechanism can be in the first leg, if needed and/or desired. The air-spring mechanism provides resistance to compression of the suspension fork 12 and releases energy stored during compression to cause the suspension fork 12 to extend, or rebound. The damping mechanism includes an upper damping unit 30 and a lower damping unit 31. The damping units 30 and 31 provide a damping force, which resists both compression and rebound motion, to slow the motion of the suspension fork 12 in either direction.

The first leg 24 includes a left upper tubular element 32 telescopically received in a left lower tubular element 34. In other words, the upper tubular element 32 includes a top portion and a bottom portion, with the bottom portion of the upper tubular element 32 being telescopically disposed within a top portion of the lower tubular element 34 such that the upper tubular element 32 is telescopically movable with respect to the lower tubular element 34. The hollow interiors of the upper and lower tubular elements 32 and 34 form an internal area of the upper and lower tubular elements 32 and 34 that changes in area when the upper and lower tubular elements 32 and 34 are moved together (compression) or moved apart (expansion or rebound).

Similarly, the second leg 26 includes a right upper tubular element 36 telescopically received in a right lower tubular element 38. In other words, the upper tubular element 36 includes a top portion and a bottom portion, with the bottom portion of the upper tubular element 36 being telescopically disposed within a top portion of the lower tubular element 38 such that the upper tubular element 36 is telescopically movable with respect to the lower tubular element 38. The hollow interiors of the upper and lower tubes 36 and 38 form an internal area of the upper and lower tubes 36 and 38 that changes in area when the upper and lower tubes 36 and 38 are moved together (compression) or moved apart (expansion or rebound).

The crown 22 connects the right upper tubular element 32 to the left upper tubular element 36 thereby connecting the first leg 24 to the second leg 26 of the suspension fork 12. Each of the lower tubular elements 34 and 38 includes a drop out 40 for connecting the front wheel 16 to the fork 12. An arch 42 connects the left lower tubular element 34 and the right lower tubular element 38 to provide strength and minimize twisting thereof. In the illustrated embodiment, the left lower tubular element 34, the right lower tubular element 38 and the arch 42 are formed as a unitary piece. However, the left lower tubular element 34, the right lower tubular element 38 and the arch 42 can be separate pieces and connected by a suitable fastening method.

The suspension fork 12 can also be provided with other conventional features. For example, disc brake bosses can be provided on one or both of the lower tubular elements 34 and 38, as needed and/or desired, for mounting a disc brake caliper. Of course, it will be apparent to those skilled in the art from this disclosure that the suspension fork 12 can be configured to mount other types of braking systems as needed and/or desired.

Still referring to FIG. 3, as previously mentioned, the upper tubular elements 32 and 36 are capable of telescopic motion relative to the lower tubular elements 34 and 38, respectively. Each of the lower tubular elements 34 and 38 has a closed (not air-tight) lower end and an open upper end. The lower ends of the upper tubular elements 32 and 36 are received into the open upper ends of the lower tubular elements 34 and 38, respectively. Each of the fork legs 24 and 26 preferably includes a sealing/bushing arrangement positioned between the respective upper tubular elements 32 and 36 and the lower tubular elements 34 and 38 at the location where the upper tubular elements 32 and 36 enter the open end of the lower tubular elements 34 and 38 in a conventional manner. Each of the upper tubular elements 32 and 36 constitutes a first tubular element, while each of the lower tubular elements 34 and 38 constitutes a second tubular element that is telescopically arranged with respect to the corresponding first tubular element.

In this illustrated embodiment, the first leg 24 includes a first bicycle suspension-setting adjustor assembly 44 for selectively controlling a suspension setting of the air-spring mechanism of the front bicycle suspension 12, while the second leg 26 includes a second bicycle suspension-setting adjustor assembly 46 for selectively controlling two different suspension settings of the damping mechanism of the front bicycle suspension 12 in accordance with one illustrated embodiment.

Still referring to FIG. 3, the air-spring mechanism within the first leg 24 is basically formed by providing the upper tubular element 32 with a first or upper sealing structure 50, a piston 51, a piston rod 52 and a second or lower sealing structure 53. A spring 54 is disposed on the piston rod 52 between the piston 51 and the lower sealing structure 53 for providing a stopper cushion when the front bicycle suspension 12 moves to a fully extended position. Basically, a positive air spring chamber 55 is formed in the upper tubular element 32 between the upper sealing member 48 and the piston 51, and a negative air spring chamber 56 is formed in the upper tubular element 32 formed between the piston 51 and the lower sealing structure 53. The positive air spring chamber 55 can be broadly considered a first air chamber, while the negative air spring chamber 56 can be broadly considered a second air chamber. When the upper and lower tubular elements 32 and 34 are compressed together, the air within the positive air spring chamber 55 of the first leg 24 compresses, while the air within the negative air spring chamber 56 of the first leg 24 expands. Thus, the air spring works by utilizing the characteristic of compressed air to resist further compression. Since the "spring" of the suspension fork 12 is provided by the compressed air rather than a coil of metal the suspension can be made lighter. Also with this type of fork design, the spring rate can easily be adjusted by adjusting the pressure of the air in the spring. This allows the suspension fork 12 to be effectively tuned to a rider's weight.

The first or upper sealing member 48 is disposed in the upper tubular element 32 (e.g., the first tubular element) adjacent the first or upper end of the upper tubular element 32 such that the positive air spring chamber 55 (e.g., a first air chamber) is formed between the piston 51 and the first or upper sealing member 48. Thus, the upper sealing member 48 closes the upper end of the upper tubular element 32 to provide a fluid-tight seal between the upper sealing member 48 and the inner surface of the upper tubular element 32. Since the top portion of the lower tubular element 34 is telescopically movable with the bottom portion of the upper tubular element 32, an adjustable internal area is formed within the upper and lower tubular elements 32 and 34.

In this embodiment, the bicycle suspension-setting adjustor assembly 44 includes a switching valve 57 disposed in the upper sealing member 48. The switching valve 57 includes a hand operated actuator 57a and a valve member 57b that is coupled to the hand operated actuator 57a. The valve member 57b cooperates with the upper sealing member 48 to selectively interconnect the positive air spring chamber 55 and the negative air spring chamber 56 via a communication passageway 58. In the illustrated embodiment, an inner tube 59 is coaxially disposed in the upper tubular element 32 to form the communication passageway 58 between the inner tube 59 and the upper tubular element 32, such that the communication passageway 58 interconnects the positive air spring chamber 55 and the negative air spring chamber 56. Accordingly, rotation of the hand operated actuator 57a rotates the valve member 57b to open and close channels in the upper sealing member 48 so that the positive air spring chamber 55 is selectively opened and closed with respect to the communication passageway 58. In other words, when the switching valve 57 is in the closed position, the communication passageway 58 closed with respect to the positive air spring chamber 55 so that fluid (e.g., air) does not flow between the two chambers 55 and 56. However, when the switching valve 57 is in the opened position, the communication passageway 58 communicates with the positive air spring chamber 55 so that fluid (e.g., air) can freely flow between the two chambers 55 and 56.

In this embodiment, the upper tubular element 32 has an internal thread that is threaded on to the upper sealing member 48. The upper end of the inner tube 59 also has an internal thread that is threaded on to the upper sealing member 48. Thus, the upper tubular element 32 and the inner tube 59 are both fixed at their upper ends to the upper sealing member 48. The lower end of the inner tube 59 has an internal thread that is threaded on to the second or lower sealing structure 53. Thus, the upper and lower sealing members 48 and 53 seal the opposite ends of the inner tube 59, with the piston 51 slidably engaged with the inner tube 59.

In the illustrated embodiment, the bicycle suspension-setting adjustor assembly 44 has an air filling valve 50 that is axially mounted in the upper sealing member 48 for supplying pressurized air to the positive air-spring chamber 55 and 62 of the first leg 24. In particular, when the switching valve 57 is in the opened position, it is possible to supply fluid (e.g., air) into both of the positive and negative air-spring chambers 55 and 56 at the same time via the air filling valve 50 by rotating the switching valve 57 to the opened position. The air filling valve 50 is a conventional valve that is well known in the art, and thus, will not be discussed and/or illustrated in further detail herein, Furthermore, in the illustrated embodiment, by telescopically moving the upper and lower tubular elements 32 and 34 relative to each other when the switching valve 57 is in the opened position, it is possible to change a suspension stroke as needed and/or desired. In other words, if a user moves the switching valve 57 from the opened position to the closed position while keeping the upper and lower tubular elements 32 and 34 in a desired position for a desired stroke length, then the stroke length can be fixed. Also, when the switching valve 57 is left in the opened position, the effective volume of the positive air spring chamber 55 will increase, and thus, an effective spring rate of the positive air spring chamber 55 will decrease with respect to the closed position of the switching valve 57.

While the switching valve 57 is illustrated with the hand operated actuator 57a that is mounted on the upper end of the first leg 24, other types of actuators can be used. Alternatively, the switching valve 57 can be remotely operated by either a remote hand operated actuator or a motorized actuator. The remote hand operated actuator or a motorized actuator can be located at various locations including, but not limited to, on the handlebar, the front suspension 12 or the frame.

Referring to FIG. 3, the piston 51 is slidably disposed in the inner tube 59 and separates the positive and negative air-spring chambers 55 and 56 of the first leg 24. In particular, the piston 51 has a seal that contacts the inner surface of the inner tube 59 to create a fluid tight seal therebetween. The piston 51 moves relative to the upper tubular element 32 in response to relative telescopic movement between the upper and lower tubular elements 32 and 34. The piston rod 52 is a rigid rod that supports the piston 51 within the upper tubular element 32 and slidably engages the lower sealing structure 53. In particular, the piston rod 52 has a first or upper end fixedly coupled to the piston 51 with a fluid tight seal therebetween, and a second or lower end fixedly coupled to the lower tubular element 34. Thus, the lower end of the piston rod 52 extends outwardly of the lower end of the upper tubular element 32 (e.g., the first tubular element) such that the lower end of the upper tubular element 32 is spaced from the bottom end of the lower tubular element 34 (e.g., the second tubular element). In other words, the lower tubular element 34 has its upper end telescopically receives in the lower end of the upper tubular element 32 and its lower end fixedly coupled to the lower end of the piston rod 52 so that the piston 51 and the piston rod 52 move with the lower tubular element 34 relative to the upper tubular element 32.

The second or lower sealing structure 53 is secured to the lower end of the inner tube 59 at a location that is spaced upwardly from the lower end of upper tubular element 32. In particular, an internal thread on the lower end of the inner tube 59 engages an external thread of the lower sealing structure 53. The lower sealing structure 53 also has an outer seal that contacts the inner surface of the upper tubular element 32 to create a fluid tight seal therebetween. An inner seal that contacts the outer surface of the piston rod 52 to create a fluid tight seal therebetween.

Referring now to FIGS. 4 to 11, as mentioned above, the second leg 26 is provided with the damping units 30 and 31 as one example of a damping mechanism for controlling the damping force of the suspension fork 12. The damping units 30 and 31 provide a damping force, which resists both compression and rebound motion, to slow the motion of the suspension fork 12 in either direction. Also, as mentioned above, the second leg 26 of the suspension fork 12 is also provided with the bicycle suspension-setting adjustor assembly 46 that changes the operating condition of the front bicycle suspension 12.

Generally speaking, in this illustrated embodiment, the damping units 30 and 31 operate in the same manner. The damping unit 30 includes a damping member 60 that is fixed at a predetermined location within the upper tubular element 36 by a rigid mounting tube or piston rod 61. The damping unit 31 includes a damping member 62 that is rigidly connected to the lower end of the lower tubular element 38 by a rigid mounting tube 63. The damping member 62 is slidably received within the upper tubular element 36 of the second leg 26. A fluid chamber 64 is defined between an upper seal member 65 and a lower seal member 66. The upper seal member 65 is movably mounted within the upper tubular element 36 of the second leg 26, while the lower seal member 66 mounted on the lower end of the upper tubular element 36. Since the upper seal member 65 is movably mounted within the upper tubular element 36 of the second leg 26, the upper seal member 65 constitutes a piston. The fluid chamber 64 contains a fluid, such as oil, therein, that is used in conjunction with the damping member 60 to act as a damper. This fluid chamber 64 is separated into three cavities 64a, 64b and 64c by the damping members 60 and 62. The upper cavity 64a is formed between the damping member 60 and the upper seal member 65. The middle cavity 64b is formed between the damping member 60 and the damping member 62. The lower cavity 64c is formed between the damping member 62 and the lower seal member 66.

The damping member 60 has a plurality of first or compression damping holes 60a and a plurality of second or rebound damping holes 60b with the holes 60a and 60b extending through the damping member 60 to allow fluid in the fluid chamber 64 to travel through the damping member 60. Thus, the damping member 60 divides the fluid chamber 64 into the upper cavity 64a and the middle cavity 64b, with the holes 60a of the damping member 60 allowing fluid to travel from one cavity to the other depending on forces acting on the upper and lower tubular elements 36 and 38. As explained below, the compression damping holes 60a allows fluid to flow therethrough during a compression stroke of the upper and lower tubular elements 36 and 38. The rebound damping holes 60b allows fluid to flow therethrough during a rebound stroke of the upper and lower tubular elements 36 and 38. Likewise, the damping member 62 has a plurality of first and second holes that extend through the damping member 62 to allow fluid in the fluid chamber 64 to travel through damping member 62. Thus, the damping member 62 divides the fluid chamber 64 into the middle cavity 64b and the lower cavity 64c, with the holes of the damping member 62 allowing fluid to travel from one cavity to the other depending on forces acting on the upper and lower tubular elements 36 and 38. Since the damping unit 31 is similar in construction to the damping unit 30, the damping member 62 and the other parts of the damping unit 31 will not be discussed and/or illustrated in detail herein.

In this illustrated embodiment, the bicycle suspension-setting adjustor assembly 46 is provided with a suspension-setting adjustment unit 67 that changes the operating condition of the damping unit 30 as discussed below. In this illustrated embodiment, the suspension-setting adjustment unit 67 includes a damper lock-out arrangement 68 and a damping force adjustment arrangement 69. The damper lock-out arrangement 68 and the damping force adjustment arrangement 69 are positioned at the upper portion of the upper tubular element 36 between the between the damping member 60 and the upper seal member 65.

In this illustrated embodiment, the bicycle suspension-setting adjustor assembly 46 is provided to allow the rider to selectively set two different operating conditions of the front bicycle suspension 12 to control expansion and contraction of the legs 24 and 26. In the illustrated embodiment, the bicycle suspension-setting adjustor assembly 46 selectively adjusts a damping force of the damping unit 30 and selectively locks out the damping unit 30.

The bicycle suspension-setting adjustor assembly 46 is further provided with a first actuator 71 that controls the damper lock-out arrangement 68. The first actuator 71 is rotated to change a first suspension setting (e.g. lock-out-on/off) of the suspension-setting adjustment unit 67. Thus, the suspension-setting adjustment unit 67 is operatively coupled to the first actuator 71. The suspension-setting adjustment unit 67 adjusts the first suspension setting of the damping unit 30 in response to rotation of the first actuator 71 by using rotational movement of the suspension-setting adjustment unit 67 as explained below. In particular, the damper lock-out arrangement 68 adjusts the first suspension setting to lock or unlock the damping unit 30 of the front bicycle suspension 12.

The bicycle suspension-setting adjustor assembly 46 is further provided with a second actuator 72 that controls the damping force adjustment arrangement 69. The first and second actuators 71 and 72 are rotatably mounted on a single rotational axis. The second actuator 72 is rotated to change a second suspension setting (e.g. increasing/decreasing a damping force) of the suspension-setting adjustment unit 67. Thus, the suspension-setting adjustment unit 67 is operatively coupled to the second actuator 72. The suspension-setting adjustment unit 67 adjusts the second suspension setting of the damping unit 30 in response to rotation of the second actuator 72 by using axial movement of the suspension-setting adjustment unit 67 as explained below. In particular, the damping force adjustment arrangement 69 adjusts the second suspension setting that increases or decreases the damping force of the damping unit 30 of the front bicycle suspension 12.

In this illustrated embodiment, the suspension-setting adjustment unit 67 also includes a suspension tube attachment structure 74 and a control rod 75. The suspension tube attachment structure 74 secures the suspension-setting adjustment unit 67 in the second leg 26 with the control rod 75 being disposed along the center axis of the upper tubular element 36. As illustrated, the suspension tube attachment structure 74 can be provided with an external thread 74a that is threaded within the upper end of the upper tubular element 36. The first actuator 71 is rotatably mounted to the suspension tube attachment structure 74. Similarly, the second actuator 72 is rotatably mounted to the suspension tube attachment structure 74 to rotate independent of rotation of the first actuator 71. The piston rod 61 is rigidly coupled to the suspension tube attachment structure 74, with the upper seal member 65 (i.e., piston) being slidably mounted on the piston rod 61. A spring 76 is coaxially mounted on the piston rod 61 for biasing the upper seal member 65 (i.e., piston) away from the suspension tube attachment structure 74. During a compression stroke of the second leg 26, the fluid in the fluid chamber 64 forces the upper seal member 65 (i.e., piston) upward towards the suspension tube attachment structure 74 against the force of the spring 76.

The control rod 75 is movably mounted within the piston rod 61 such that the control rod 75 can move in an axially direction within the piston rod 61 and such that the control rod 75 can rotate within the piston rod 61. In this illustrated embodiment, the first and second actuators 71 and 72 are operatively coupled to the control rod 75 such that rotation of the first actuator 71 rotates the control rod 75 about a longitudinal axis A of the control rod 75 and such that rotation of the second actuator 72 axially moves the control rod 75 along the longitudinal axis A of the control rod 75. Thus, the control rod 75 is operated by rotation of the first and second actuators 71 and 72 to the damper lock-out arrangement 68 and the damping force adjustment arrangement 69, respectively.

Figure 10:
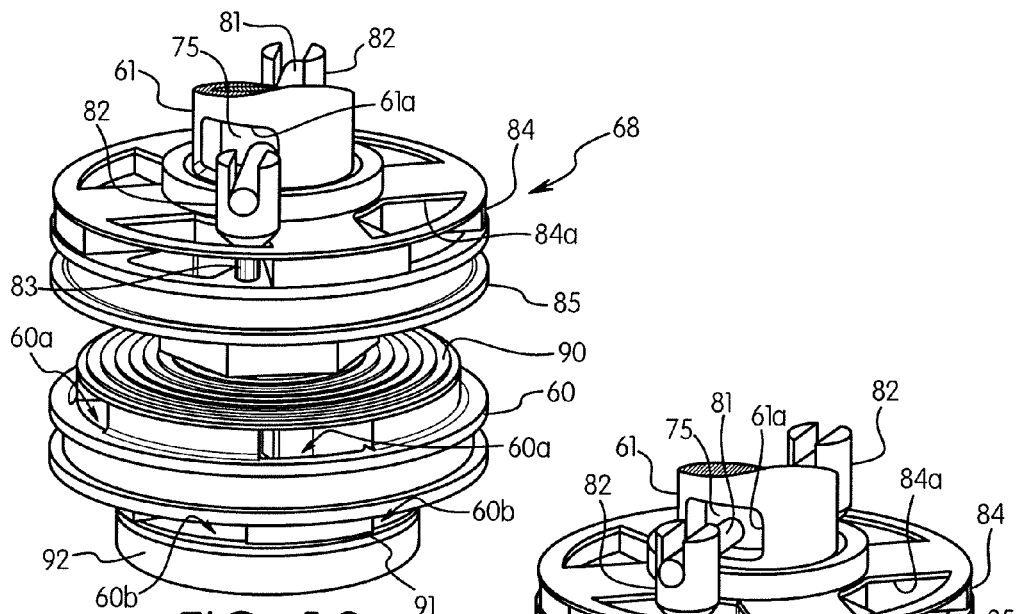
FIG. 10 is a perspective view of the bicycle suspension-setting adjustor assembly in accordance with the illustrated embodiment.
Figure 11:
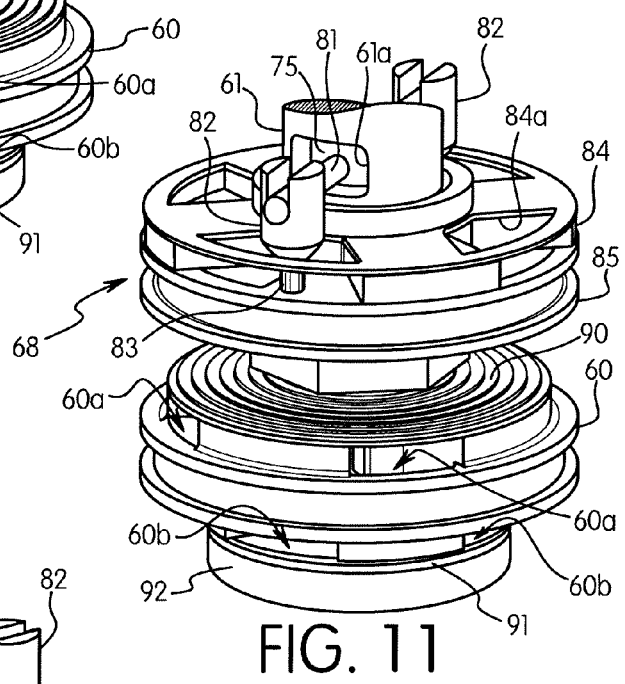
FIG. 11 is a perspective view of the bicycle suspension-setting adjustor assembly in accordance with the illustrated embodiment.
Figure 12:
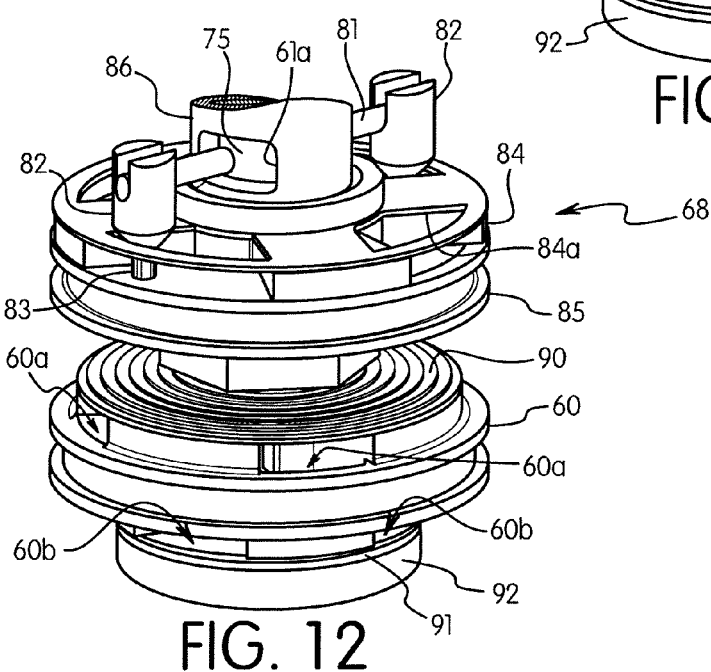
FIG. 12 is a perspective view of the bicycle suspension-setting adjustor assembly in accordance with illustrated embodiment.

The first actuator 71 is coupled to the control rod 75 such that the first actuator 71 and the control rod 75 rotate together as a single unit. In this illustrated embodiment, the first actuator 71 is rigidly attached to the upper end of the control rod 75 and retained on the upper end of the control rod 75 by a retaining clip 77. When the first actuator 71 is rotated, the control rod 75 rotates therewith. Also when the first actuator 71 is rotated, the control rod 75 does not move in an axial direction within the upper tubular element 36. In this way, the suspension-setting adjustment unit 67 adjusts the first suspension setting of the damping unit 30 in response to rotation of the first actuator 71 by using solely rotational movement of the control rod 75. As seen in FIGS. 10 to 12, the damper lock-out arrangement 68 with the first suspension setting has a closed position (see FIG. 12) in response to rotation of the first actuator 71 in a first rotational direction and an opened position (see FIG. 10) in response to rotation of the first actuator 71 in a second rotational direction.

The second actuator 72 is not directly attached to the control rod 75. Rather, the second actuator 72 is operatively coupled to the control rod 75 such that rotation of the second actuator 72 moves the control rod 75 in an axial direction within the upper tubular element 36. Also when the second actuator 72 is rotated, the control rod 75 does not rotate. In this way, the suspension-setting adjustment unit 67 adjusts the second suspension setting of the damping unit 30 in response to rotation of the second actuator 72 by using solely axial movement of the control rod 75. As seen in FIGS. 5 and 6, the damping force adjustment arrangement 69 with the second suspension setting increases the damping force in response to rotation of the second actuator 72 in a first rotational direction (see FIG. 5) and decreases the damping force in response to rotation of the second actuator 72 in a second rotational direction (see FIG. 6).

In this illustrated embodiment, the second actuator 72 is operatively coupled to the control rod 75 by a pushing element 78 such that rotation of the second actuator 72 causes the pushing element 78 to move the control rod 75 in an axial direction of the control rod 75 as seen in FIGS. 5 and 6. In this illustrated embodiment, the second actuator 72 is rigidly attached to the pushing element 78 so that they rotate as a unit. The pushing element 78 has a male thread 78a that is threadedly engaged with an internal female thread 74b of the suspension tube attachment structure 74. Thus, rotation of the pushing element 78 by the second actuator 72 causes axial movement of the pushing element 78 with respect to the suspension tube attachment structure 74. This axial movement of the pushing element 78 is transmitted to the control rod 75 so that they move together as a unit in the axial direction without the control rod 75 rotating during rotation of the pushing element 78 by the second actuator 72.

In this illustrated embodiment, as seen in FIGS. 10 to 12, the damper lock-out arrangement 68 is provided with a cross member 81, a pair of cup members 82, a pair of shaft members 83, a stationary shutter plate 84, and a movably shutter plate 85. The cross member 81 is preferably attached to the vicinity of the lower end of the control rod 75 to move therewith. The cross member 81 extends through openings 61a in the piston rod 61. The openings 61a in the piston rod 61 are dimensioned with respect to the cross member 81 such that the cross member 81 move in the openings 61a in both the axial direction of the control rod 75 and the rotational direction with respect to the control rod 75. The ends of the cross member 81 are disposed in the cup members 82 such that the cross member 81 can move in the axial direction of the control rod 75 without moving the cup members 82 in the axial direction of the control rod 75. The shaft members 83 interconnect the cup members 82 to the movably shutter plate 85 such that rotation of the control rod 75 causes the movably shutter plate 85 to rotate therewith via the cross member 81, the cup members 82 and the shaft members 83 in response to rotation of the first actuator 71. By rotating the movably shutter plate 85, openings 85a in the movably shutter plate 85 to be selectively aligned or offset from openings 84a in the stationary shutter plate 84. When the openings 84a and 85a are aligned (FIG. 10), the damper lock-out arrangement 68 is in the non-lock-out position. When the openings 84a and 85a are offset (FIG. 12), the damper lock-out arrangement 68 is in the lock-out position.

In this illustrated embodiment, the damping force adjustment arrangement 69 is provided with an orifice member 89. The orifice member 89 is attached to the lower end of the piston rod 61 at a location that is below the damper lock-out arrangement 68. The orifice member 89 has a plurality of orifices 89a extending radially from an axially extending bore 89b. The control rod 75 has a lower tip end 75a that selectively contacts a seat 89c of the orifice member 89 to selectively open and close a fluid path between the orifices 89a and the bore 89b in response to rotation of the second actuator 72.

In addition to the damping member 60, the damping unit 30 also includes a flexible spring plate 90, a regulator plate 91, a retainer cap 92 and a spring 93. The first flexible spring plate 90 acts as a one-way valve that allows fluid to flow through the compression damping holes 60a during a compression stroke, but that prevents fluid to flow through the compression damping holes 60*a* during a rebound stroke. In this illustrated embodiment, the flexible spring plate 90 is formed of several individual plates with consecutively decreasing diameters. The regulator plate 91 in conjunction with the retainer cap 92 and the spring 93 acts as a one-way valve that allows fluid to flow through the rebound damping holes 60*b* during a rebound stroke, but that prevents fluid to flow through the rebound damping holes 60*b* during a compression stroke.

In the bicycle suspension-setting adjustor assembly 46 of this illustrated embodiment, the first suspension setting is adjusted by rotating the first actuator 71 without converting the rotational movement of the first actuator 71 into axial movement of the control rod 75 or any other part. Because the rotational movement of the first actuator 71 is not converted into axial movement to adjust the first suspension setting, it is possible to omit structure that convert the rotational movement of the first actuator 71 into axial movement. Therefore, freedom of layout about internal components can be increased.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the bicycle suspension, the following directional terms "upward," "downward," "vertical" and "horizontal" as well as any other similar directional terms refer to those directions of a bicycle equipped with the bicycle suspension. Accordingly, these terms, as utilized to describe the bicycle suspension should be interpreted relative to a bicycle equipped with the bicycle suspension as used in the normal riding position. Finally, terms of degree such as "substantially", "about" and "approximately" as used herein mean a reasonable amount of deviation of the modified term such that the end result is not significantly changed.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions are provided for illustration only, and not for the purpose of limiting the invention as defined by the appended claims and their equivalents.

What is claimed is:

1. A bicycle suspension-setting adjustor assembly comprising:
    a suspension tube attachment structure;
    a first actuator rotatably mounted to the suspension tube attachment structure;
    a second actuator mounted rotatably relative to the suspension tube attachment structure to rotate independently of rotation of the first actuator; and
    a suspension-setting adjustment unit including a control rod operatively coupled to the first actuator such that the first actuator and the control rod rotate together as a single unit about a longitudinal axis of the control rod to adjust a first suspension setting in response to the rotation of the first actuator by using rotational movement of the suspension-setting adjustment unit, and the second actuator being operatively coupled to the control rod such that the rotation of the second actuator axially moves the control rod along the longitudinal axis of the control rod with the control rod being rotationally stationary about the longitudinal axis of the control rod to adjust a second suspension setting in response to the rotation of the second actuator by using axial movement of the suspension-setting adjustment unit.

2. The bicycle suspension-setting adjustor assembly according to claim 1, wherein
    the first actuator is coupled to an axial end portion of the control rod, and
    the control rod extends through the suspension tube attachment structure and the second actuator.

3. The bicycle suspension-setting adjustor assembly according to claim 2, wherein
    the second actuator is coupled to the control rod by a pushing element that is threadedly engaged with the suspension tube attachment structure such that the rotation of the second actuator causes the pushing element to move the control rod in an axial direction of the control rod.

4. The bicycle suspension-setting adjustor assembly according to claim 3, wherein
    the suspension tube attachment structure has a piston rod coupled thereto, with a piston slidably mounted on the piston rod.

5. The bicycle suspension-setting adjustor assembly according to claim 4, wherein
    the control rod is movably mounted within the piston rod.

6. The bicycle suspension-setting adjustor assembly according to claim 5, wherein
    the first and second actuators are rotatably mounted about a single rotational axis.

7. The bicycle suspension-setting adjustor assembly according to claim 5, wherein
    the suspension setting adjustment unit includes a damper lock-out arrangement with the first suspension setting including a closed position in response to the rotation of the first actuator in a first rotational direction and an opened position in response to the rotation of the first actuator in a second rotational direction.

8. The bicycle suspension-setting adjustor assembly according to claim 5, wherein
    the suspension-setting adjustment unit includes a damping force adjustment arrangement with the second suspension setting increasing damping force in response to the rotation of the second actuator in a first rotational direction and decreasing the damping force in response to the rotation of the second actuator in a second rotational direction.

9. The bicycle suspension-setting adjustor assembly according to claim 1, wherein
    the suspension tube attachment structure has a piston rod coupled thereto, with a piston slidably mounted on the piston rod.

10. The bicycle suspension-setting adjustor assembly according to claim 9, wherein
    the control rod is movably mounted within the piston rod.

11. The bicycle suspension-setting adjustor assembly according to claim 1, wherein
    the second actuator is coupled to the control rod by a pushing element that is threadedly engaged with the suspension tube attachment structure such that the rotation of the second actuator causes the pushing element to move the control rod in an axial direction of the control rod.

12. The bicycle suspension-setting adjustor assembly according to claim 1, wherein
the first and second actuators are rotatably mounted about a single rotational axis.

13. The bicycle suspension-setting adjustor assembly according to claim 1, wherein
the suspension-setting adjustment unit includes a damper lock-out arrangement with the first suspension setting including a closed position in response to the rotation of the first actuator in a first rotational direction and an opened position in response to the rotation of the first actuator in a second rotational direction.

14. The bicycle suspension-setting adjustor assembly according to claim 1, wherein
the suspension-setting adjustment unit includes a damping three adjustment arrangement with the second suspension setting increasing damping force in response to the rotation of the second actuator in a first rotational direction and decreasing the damping force in response to the rotation of the second actuator in a second rotational direction.

* * * * *